UNITED STATES PATENT OFFICE 2,680,733

ACETALS CONTAINING A CYANOACETYL GROUP

Elmore Louis Martin, Wilmington, Del., assignor to E. I. du Pont de Nemours and Company, Wilmington, Del., a corporation of Delaware No Drawing. Application November 2, 1950, Serial No. 193,754

9 Claims. (Cl. 260—66)

This invention relates to a new class of acetals. More particularly, it relates to new color-forming acetals having specific usefulness in color photography.

Acetals of various derivatives of m-aminobenzaldehyde have been proposed heretofore for use in the color coupling development process of color photography. For example, outstanding magenta color-formers containing the acetalized m-aminobenzaldehyde nucleus are described in U. S. Patents 2,472,911, 2,476,988 and 2,489,655. It has now been found that acetals of aldehydes belonging to a new and different class are also useful as magenta color-formers.

The new products of this invention are the acetals, with monohydric and polyhydric alcohols, of aldehydes of the formula:

OHC—(CH$_2$)$_n$—Q—R—CO—CH$_2$—CN wherein R is a divalent radical, aromatic in character, whose terminal atoms are carbon, Q is oxygen or sulfur and n is an integer from 1 to 6, and photographic silver halide emulsions containing these acetals.

For convenience, aldehydes of the above-defined class will be sometime generically referred to hereinafter as cyanoacetylaryloxy substituted aliphatic aldehydes, even though the radical R is not limited to aryl but includes any cyclic or heterocyclic radical which is aromatic in character, and Q is not limited to oxygen but can also be sulfur.

In the acetals defined above, the alcohol portion of the molecule, i. e., the portion acetalized with the cyanoacetylaryloxy-substituted aldehyde, can be any monohydric or polyhydric alcohol. It is preferably either a monomeric alkanol of 1 to 4 carbon atoms, or a monomeric 1,2- or 1,3-alkanediol of 2 to 4 carbon atoms, or a hydroxyl polymer which is water-soluble to hydrophilic in character and contains a large number of recurring intralinear

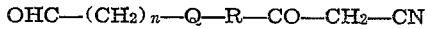
—CH$_2$—CHOH groups as polymer-forming units, e. g., polyvinyl alcohol, partly hydrolyzed polyvinyl esters, hydrolyzed interpolymers of vinyl esters with minor proportions of other vinyl compounds, said hydrolyzed interpolymers containing a large number of recurring

—CH$_2$—CHOH groups. The acetals of monomeric alcohols may be used as such in photographic silver halide emulsions or dispersions containing a water-permeable colloid, e. g., gelatin, polyvinyl alcohol, etc., or they may be used as intermediates in the preparation of the acetals of hydroxyl polymers such as polyvinyl alcohol, the latter being hard film-forming colloids and used in photographic emulsions as both the color-former and the water-permeable binding agent for the silver halide grains.

The radical R in the above formula may be any divalent cyclic radical having aromatic properties. Thus, it can be an arylene or substituted arylene radical or a heterocyclic radical which is aromatic in character, the latter forming a well-recognized chemical class (see, for example, Whitmore's Organic Chemistry, pages 874–875, published by D. Van Nostrand and Company, New York, N. Y., 1937).

The compounds of this invention may be prepared by various methods. One method, illustrated in the examples which follow, comprises the following steps: (1) reacting an alkali metal "salt" of a carbalkoxy-substituted nuclear compound having a hydroxyl or thiol group directly attached to a carbon atom of the aromatic nucleus with a monomeric alcohol acetal of an omega-halogenated aliphatic aldehyde, to give the corresponding acetal of a carbalkoxyaryloxy (or carbalkoxyarylthio)-substituted aliphatic aldehyde (I); (2) reacting (I) with acetonitrile in the presence of a condensing agent to give a cyanoacetylaryloxy (or cyanoacetylarylthio)-substituted aliphatic aldehyde (II); and (3) if desired, reacting (II) with a polymeric polyhydric alcohol under acetal-interchange conditions to give a polymeric alcohol acetal of a cyanoacetylaryloxy (or cyanoacetylarylthio)-substituted aliphatic aldehyde (III). The above steps are shown schematically by the following equations, using ethyl p-hydroxybenzoate, chloroacetaldehyde dimethyl acetal and polyvinyl alcohol as illustrative reactants:

1.

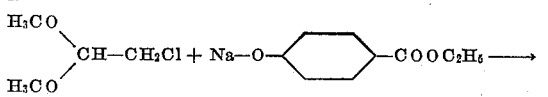

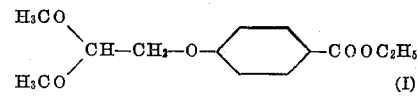

2.

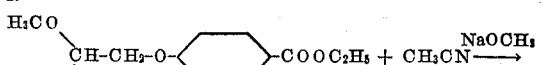

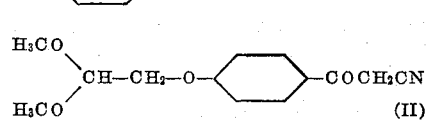

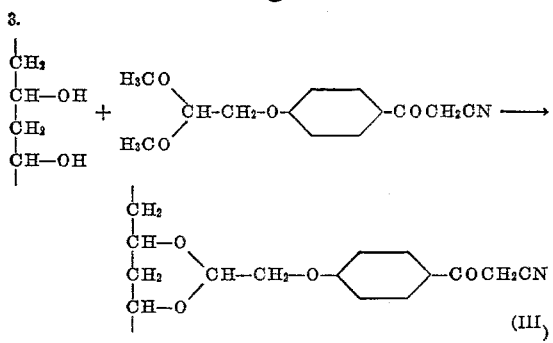

The invention is illustrated in greater detail by the following examples, in which parts are by weight unless otherwise noted.

EXAMPLE I

A. (p-Carbethoxyphenoxy) acetaldehyde dimethyl acetal

To a solution of 24 parts of sodium in 200 parts of absolute ethanol there was added 166 parts of ethyl p-hydroxybenzoate followed by the addition of 125 parts of chloroacetaldehyde dimethyl acetal. The resulting mixture was heated in a closed reaction vessel at 170–180° C. for 8 hours. After cooling, the reaction vessel was opened, the reaction mixture was poured onto water, methylene chloride was added and the organic layer was separated. Distillation of the residue after concentration gave 165 parts of (p-carbethoxyphenoxy)-acetaldehyde dimethyl acetal, B. P. 150–155° C. at 1 mm. The compound solidified on standing.

B. (p-Cyanoacetylphenoxy) acetaldehyde dimethyl acetal

A mixture of 102 parts of (p-carbethoxyphenoxy)-acetaldehyde dimethyl acetal, 100 parts of acetonitrile and 45 parts of sodium methylate was heated on a steam bath with mechanical stirring under reflux condenser for a period of three hours. Most of the excess acetonitrile was removed by distillation, 1500 parts of cold water were added and the resulting solution was neutralized with acetic acid. The crude (p-cyanoacetylphenoxy)-acetaldehyde dimethyl acetal was crystallized three times from a methylene chloride-ether mixture. The yield of colorless crystals melting at 96–98° C. was 66 parts. The compound has the formula:

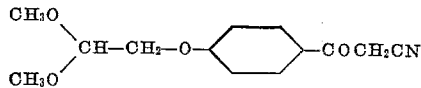

Analysis:
Calculated for $C_{12}H_{13}O_4N$_____ N, 5.62
Found _____ N, 5.59; 5.69

C. (p-Cyanoacetylphenoxy) acetaldehyde polyvinyl acetal

A mixture of 5 parts of polyvinyl alcohol, 1 part of (p-cyanoacetylphenoxy) acetaldehyde dimethyl acetal, 0.1 part of o-sulfobenzaldehyde sodium salt, 30 parts of ethylene glycol and 1 part of 6 N hydrochloric acid was stirred at 70° C. for 1 hour. The reaction mixture was cooled to 25° C. and then diluted with 150 parts of methanol. The colorless polyvinyl acetal was collected, washed with methanol, slurried twice with 200 parts of methanol and air dried.

D. Photographic emulsion using (p-cyanoacetylphenoxy)-acetaldehyde polyvinyl acetal To 5 parts of (p-cyanoacetylphenoxy) acetaldehyde polyvinyl acetal modified with o-sulfobenzaldehyde and prepared as above was added 25 parts of ethanol, 75 parts of water, and 0.25 part of a 10% solution of sodium carbonate. After heating with stirring at 70–75° C. for 15 minutes, a homogeneous solution was obtained which was cooled to room temperature and used to prepare a silver halide emulsion under conditions which did not cause fogging or exposure of the sensitive silver salts as follows:

To 35 parts of the above solution there was added 10 parts of ethanol and at 50° C. there was added separately and at equivalent rates during the course of 5 minutes a mixture of 15.5 parts of 3 N ammonium bromide solution, 1 part of 0.5 N potassium iodide solution, and 16 parts of water, together with a mixture of 14.5 parts of 3 N silver nitrate solution, 14.5 parts of a 20% ammonium hydroxide solution and 3.5 parts of water. After stirring for a total of 30 minutes, the emulsion which had formed was run into 125 parts of a 15% sodium sulfate solution. The precipitated silver halide-color-forming emulsion was collected, rolled into a thin film, cut into small pieces, and washed for one hour in running water, after which the excess water was drained off. Fifteen (15) parts of ethanol and 10 parts of water were added and the mixture was stirred at 65–70° C. for 15 minutes. The remainder of the original polyvinyl acetal solution was added and the mixture was stirred for an additional period of 5 minutes. After cooling to 30° C., the emulsion was coated on film base. The resulting photographic film was exposed to form latent images, then developed in a solution made by mixing the following components.

| | Parts |
|---|---|
| p-Aminodiethylaniline hydrochloride | 2.5 |
| Sodium sulfite (anhydrous) | 10.0 |
| Sodium carbonate (monohydrate) | 20.0 |
| Potassium bromide | 2.0 |
| Water to make 1000.0 cc. | |

The film was then fixed in 25% sodium thiosulfate solution, washed, bleached in a 4% potassium ferricyanide solution, washed, fixed in a 25% sodium thiosulfate solution, washed and dried. The resulting film contained a reddish magenta negative dye image.

EXAMPLE II

A. (p-Carbethoxyphenoxy) acetaldehyde ethylene glycol acetal

To a solution of 24 parts of sodium in 250 parts of ethanol there was added 166 parts of ethyl p-hydroxybenzoate followed by the addition of 122.5 parts of chloroacetaldehyde ethylene glycol acetal (prepared by distilling a mixture of 500 parts of chloroacetaldehyde dimethyl acetal, 250 parts of ethylene glycol and 2 parts of concentrated hydrochloric acid. As soon as the removal of the methanol was complete, the temperature rose rapidly to 156° C. The fraction boiling at 156.5–158° C. was the chloroacetaldehyde ethylene glycol acetal). The resulting mixture was heated at 170–180° C. for 8 hours. After cooling, the reaction mixture was poured onto water, the solid material was collected, washed with water and dissolved in methylene chloride. Distillation of the residue after concentration gave 160 parts of (p-carbethoxyphenoxy)-acetaldehyde ethylene glycol acetal, B. P. 165–170° C. at 1 mm. The material solidified on cooling and crystallization from ether gave colorless needles, M. P. 85–87° C.

Analysis:
Calcd. for $C_{13}H_{16}O_5$_____ C, 61.88; H, 6.40
Found _____ C, 61.98; H, 6.52

B. (p-Cyanoacetylphenoxy)acetaldehyde ethylene glycol acetal

A mixture of 101 parts of (p-carbethoxyphenoxy)acetaldehyde ethylene glycol acetal, 100 parts of acetonitrile and 40 parts of sodium methylate was heated on a steam bath with mechanical stirring under reflux condenser for 2.5 hours, 100 parts of dioxane being added after about 1 hour. One thousand (1000) parts of cold water was added and the solution neutralized with acetic acid. The crude (p-cyanoacetylphenoxy)acetaldehyde ethylene glycol acetal was crystallized from methylene chloride. The yield of fine, colorless needles melting at 165–167° C. was 65 parts. The compound has the formula:

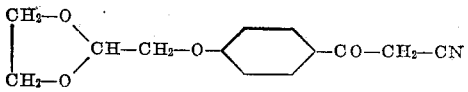

Analysis:
Calcd. for $C_{13}H_{13}O_4N$_____ C, 63.13; H, 5.13; N, 5.67
Found _____ C, 63.16; H, 5.46; N, 5.68

EXAMPLE III

A. (p-Carbethoxyphenylmercapto)acetaldehyde dimethyl acetal

To a solution of 5 parts of sodium in 150 parts of absolute ethanol there was added 36 parts of ethyl p-mercaptobenzoate (prepared by the esterification of p-mercaptobenzoic acid with ethanol in the presence of hydrogen chloride. The p-mercaptobenzoic acid was prepared from p-aminobenzoic acid essentially as described in Organic Syntheses, Collective volume II, p. 580, for the preparation of thiosalicylic acid.) followed by the addition of 26 parts of chloroacetaldehyde dimethyl acetal. The mixture was refluxed for 3 hours, diluted with water, and the organic material was extracted with methylene chloride. Fractionation gave 27 parts of (p-carbethoxyphenylmercapto)acetaldehyde dimethyl acetal boiling at 160–164° C. at 1 mm.

B. (p-Cyanoacetylphenylmercapto)acetaldehyde dimethyl acetal

A mixture of 27 parts of (p-carbethoxyphenylmercapto)acetaldehyde dimethyl acetal, 9 parts of sodium methylate and 50 parts of acetonitrile was heated on a steam bath under reflux condenser with mechanical stirring for 0.5 hour. The reaction mixture was diluted with water and neutralized with acetic acid. The precipitated (p-cyanoacetylphenylmercapto)acetaldehyde dimethyl acetal was collected, washed with water and crystallized from methylene chloride. There was obtained 20.4 parts of glistening colorless plates, M. P. 83–85° C. The compound has the formula:

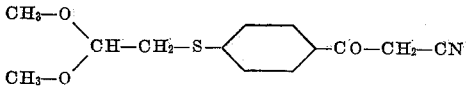

Analysis:
Calcd. for $C_{13}H_{15}O\ NS$_____ N, 5.28; S, 12.09
Found _____ N, 5.12; S, 12.20

C. (p-Cyanoacetylphenylmercapto)acetaldehyde polyvinyl acetal

A mixture of 10 parts of polyvinyl alcohol, 0.4 part of o-sulfobenzaldehyde sodium salt, 2 parts of (p-cyanoacetylphenylmercapto)acetaldehyde dimethyl acetal, 65 parts of ethylene glycol and 0.9 part of 92% phosphoric acid was stirred at 75° C. for 12 hours. The colorless (p-cyanoacetylphenylmercapto)acetaldehyde polyvinyl acetal was isolated essentially as described in Example I, section C.

D. Photographic emulsion using (p-cyanoacetylphenylmercapto)acetaldehyde polyvinyl acetal Ten (10) parts of (p-cyanoacetylphenylmercapto)acetaldehyde polyvinyl acetal was dissolved in a mixture of 40 parts of absolute ethanol, 150 parts of water and 0.5 part of 10% sodium carbonate solution essentially as described in Example I, section D. A silver halide emulsion was prepared, coagulated, washed, redispersed and coated on film base essentially as described in Example I, section D. The exposed film gave a reddish magenta negative dye image when processed essentially as described in Example I, section D.

EXAMPLE IV

A. (2-carbethoxy-3-naphthoxy)acetaldehyde dimethyl acetal

To a solution of 24 parts of sodium in 200 parts of ethanol there was added 216 parts of ethyl 3-hydroxy-2-naphthoate followed by the addition of 125 parts of chloroacetaldehyde dimethyl acetal. The resulting mixture was heated in a closed vessel at 170–180° C. for 8 hours. After cooling, the reaction vessel was opened, the reaction mixture was poured onto water, methylene chloride was added and the organic layer was separated. Distillation of the residue after concentration gave 200 parts of (2-carbethoxy-3-naphthoxy)acetaldehyde dimethyl acetal boiling at 180–185° C. at 8 mm.

B. (2-cyanoacetyl-3-naphthoxy)acetaldehyde dimethyl acetal

A mixture of 60 parts of (2-carbethoxy-3-naphthoxy)acetaldehyde dimethyl acetal, 60 parts of acetonitrile and 20 parts of sodium methylate was heated on a steam bath with mechanical stirring under reflux condenser for a period of 1.5 hours. After cooling, 3000 parts of cold water was added and the solution was neutralized with acetic acid. The crude (2-cyanoacetyl-3-naphthoxy)acetaldehyde dimethyl acetal was collected, washed with water and crystallized from a methylene chloride-ether mixture. There was obtained 35 parts of colorless crystals melting at 134–137° C. The compound has the formula:

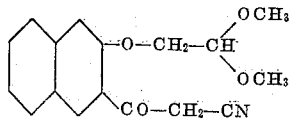

Analysis:
Calcd. for $C_{17}H_{17}O_4N$_____ C, 68.20; H, 5.73; N, 4.68
Found _____ C, 68.04; H, 5.74; N, 4.98

The following illustrates a developing solution containing this color coupler:

SOLUTION A

|  | Grams |
|---|---|
| p-Aminodiethylaniline hydrochloride | 0.25 |
| Sodium sulfite (anhydrous) | 0.25 |
| Sodium carbonate (monohydrate) | 2.50 |
| Water to make 100 cc. | |

SOLUTION B

| | |
|---|---|
| (2 - cyanoacetyl-3-naphthoxy)-acetaldehyde dimethyl acetal_____grams__ | 0.2 |
| Potassium hydroxide (10% solution)____cc__ | 1.0 |
| Methanol _____cc__ | 5.0 |

For use Solution B is aded to Solution A.
Development of a piece of exposed silver halide-gelatin emulsion on film base in the above developing formula gives a magenta dye together with a silver image. Removal of the silver image by means of potassium ferricyanide and sodium thiosulfate as described in Example I, section D, gave a reddish magenta dye.

EXAMPLE V

A. β - (p - Carbethoxyphenoxy)propionaldehyde diethyl acetal

To a solution of 12 parts of sodium in 125 parts of absolute ethanol there was added 83 parts of ethyl p-hydroxybenzoate and 80 parts of β-chloropropionaldehyde diethyl acetal (see Organic Syntheses, Collective volume II, p. 137, for the preparation of this compound). The resulting mixture was heated in a closed reaction vessel at 160–170° C. for 8 hours. After cooling, the reaction mixture was poured onto water and the organic material was extracted with methylene chloride. Concentration and distillation of the residue gave 92 parts of β-(p-carbethoxyphenoxy)propionaldehyde diethyl acetal boiling at 165–170° C. at 1 mm.

B. β - (p - Cyanoacetylphenoxy)propionaldehyde diethyl acetal

A mixture of 30 parts of β-(p-carbethoxyphenoxy)-propionaldehyde diethyl acetal, 10 parts of sodium methylate and 40 parts of acetonitrile was heated on a steam bath under reflux condenser with mechanical stirring for 4 hours. The reaction mixture was diluted with 200 parts of water and the solution was neutralized with acetic acid. The crude β-(p-cyanoacetylphenoxy)propionaldehyde diethyl acetal was crystallized from a methylene chloride-ether mixture to give colorless crystals melting at 82–84° C. The compound has the formula:

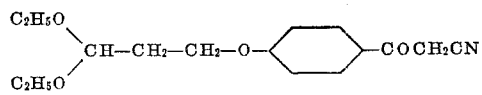

Analysis:
Calcd. for $C_{16}H_{21}O_4N$ _____ C, 65.93; H, 7.27; N, 4.81
Found _____ C, 66.01; H, 7.29; N, 4.94

C. β - (p - Cyanoacetylphenoxy)propionaldehyde polyvinyl acetal

A mixture of 10 parts of polyvinyl alcohol, 2 parts of β-(p-cyanoacetylphenoxy)propionaldehyde diethyl acetal, 0.1 part of o-sulfobenzaldehyde sodium salt, 75 parts of ethylene glycol and 1.2 parts of 92% phosphoric acid was stirred at 75° C. for 7 hours. The colorless β-(p-cyanoacetylphenoxy)propionaldehyde polyvinyl acetal was isolated essentially as described in Example I, section C.

D. Photographic emulsion using β-(p-cyanoacetylphenyl)propionaldehyde polyvinyl acetal A 5% solution of the above β-(p-cyanoacetylphenoxy)propionaldehyde polyvinyl acetal in ethanol-water was prepared essentially as described in Example I, section D. A silver halide emulsion was prepared, coagulated, washed, redispersed, and coated on film base essentially as described in Example I, section D. Processing a piece of the exposed photographic film according to the outline in Example I, section D, yielded a reddish magenta negative dye image.

EXAMPLE VI

A. β - (p - Carbethoxyphenoxy)propionaldehyde ethylene glycol acetal

To a solution of 25 parts of sodium in 225 parts of absolute ethanol was added 166 parts of ethyl p-hydroxybenzoate, and 136.5 parts of β-chloropropionaldehyde ethylene glycol acetal (prepared essentially as described in Organic Syntheses, Collective volume II, p. 137, from acrolein, ethylene glycol and hydrogen chloride). The resulting mixture was heated in a closed reaction vessel for 4 hours at 140–150° C. and then for 4 hours at 150–160° C. After cooling, the reaction mixture was poured onto water, the solid material was collected, dissolved in methylene chloride and, after concentration, the residue was distilled. There was obtained 182 parts of β-(p-carbethoxyphenoxy)propionaldehyde ethylene glycol acetal, B. P. 170–175° C. at 1 mm. which solidified and melted at 46–48° C.

Analysis:
Calcd. for $C_{13}H_{16}O_5$ _____ C, 63.13; H, 6.82
Found _____ C, 63.35; H, 6.99

B. β - (p - Cyanoacetylphenoxy)propionaldehyde ethylene glycol acetal

A mixture of 52 parts of β-(p-carbethoxyphenoxy)propionaldehyde ethylene glycol acetal, 20 parts of sodium methylate and 40 parts of acetonitrile was heated on a steam bath under reflux condenser with mechanical stirring for 4 hours. After cooling, the reaction mixture was diluted with 500 parts of cold water and the resulting mixture was neutralized with acetic acid. The crude β-(p-cyanoacetylphenoxy)propionaldehyde ethylene glycol acetal was crystallized from methylene chloride to give colorless crystals, M. P. 155–156° C. The compound has the formula:

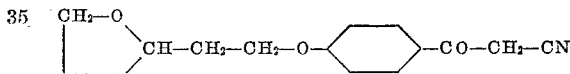

Analysis:
Calcd. for $C_{14}H_{15}O_4N$ _____ C, 64.34; H, 5.79; N, 5.37
Found _____ C, 64.09; H, 5.82; N, 5.42

C. β - (p - Cyanoacetylphenoxy)propionaldehyde polyvinyl acetal

A mixture of 10 parts of polyvinyl alcohol, 0.1 part of o-sulfobenzaldehyde sodium salt, 0.3 part of p-toluenesulfonic acid monohydrate and 65 parts of ethylene glycol was stirred at 75° C. for 10 minutes. A solution of 2 parts of β-(p-cyanoacetylphenoxy)propionaldehyde ethylene glycol acetal in 6.5 parts of dioxane was added and the resulting mixture was stirred at 75° C. for 0.75 hour. The colorless β-(p-cyanoacetylphenoxy)propionaldehyde polyvinyl acetal was isolated essentially as described in Example I, section C.

D. Photographic emulsion using β-(p-cyanoacetylphenoxy) propionaldehyde polyvinyl acetal Ten (10) parts of β-(p-cyanoacetylphenoxy)propionaldehyde polyvinyl acetal was dissolved in a mixture of 40 parts of ethanol, 150 parts of water and 0.5 part of 10% sodium carbonate solution essentially as described in Example I, section D. A silver halide emulsion was prepared, coagulated, washed, redispersed and coated on film base essentially as described in Example I, section D. A piece of the exposed photographic film was processed essentially as described in Example I, section D. The magenta negative dye image was identical with that obtained in Example V.

EXAMPLE VII

A. β - (2 - carbethoxy - 3 - methyl - 6 - benzofuranoxy)propionaldehyde ethylene glycol acetal To a solution of 11.5 parts of sodium in 200 parts of absolute ethanol was added 103 parts of ethyl 6 - hydroxy - 3 - methylbenzofuran - 2-carboxylate (see Karrer and Widner, Helv. 2, 459, (1919)) and 68 parts of β-chloropropionaldehyde ethylene glycol acetal. The reaction mixture was heated in a closed reaction vessel at 140–150° C. for 4 hours and then at 150–160° C. for 4 hours. After cooling, the reaction product was poured into water, the crude β-(2-carbethoxy-3-methyl-6-benzofuranoxy) propionaldehyde ethylene glycol acetal was collected, washed with water, and crystallized from ether-petroleum ether. The yield of colorless crystals melting at 80–82° C. was 117 parts.

Analysis:
Calcd. for $C_{17}H_{20}O_6$ _____ C, 63.71; H, 6.30
Found _____ C, 63.73; H, 6.37

B. *β-(2-cyanoacetyl-3-methyl-6-benzofuranoxy) propionaldehyde ethylene glycol acetal*

A mixture of 48 parts of β-(2-carbethoxy-3-methyl-benzofuranoxy) propionaldehyde ethylene glycol acetal, 100 parts of acetonitrile and 15 parts of sodium methylate was heated at 75–80° C. with mechanical stirring for 30 minutes. After cooling, the reaction mixture was diluted with 500 parts of cold water and the resulting solution was neutralized with acetic acid. The crude β - (2 - cyanoacetyl - 3 - methyl - 6 - benzofuranoxy) propionaldehyde ethylene glycol acetal was collected, washed with water and crystallized twice from a methylene chloride-ether mixture. There was obtained 32 parts of fine, colorless crystals melting at 149–151° C. The compound has the formula:

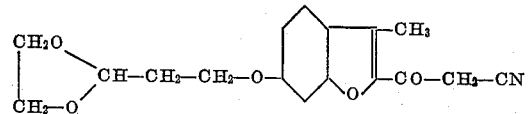

Analysis:
Calcd. for $C_{17}H_{15}O_5N$ _____ C, 64.74; H, 5.44; N, 4.45
Found _____ C, 64.72; H, 5.45; N, 4.72

C. *β - (Cyanoacetyl - 3 - methyl - 6 - benzofuranoxy) propionaldehyde polyvinyl acetal*

A mixture of 10 parts of polyvinyl alcohol, 0.1 part of o-sulfobenzaldehyde sodium salt, 2.4 parts of β-(2-cyanoacetyl-3-methyl-6-benzofuranoxy) propionaldehyde ethylene glycol, 65 parts of ethylene glycol, 17 parts of dioxane and 0.3 part of p-toluenesulfonic acid monohydrate was stirred at 68–70° C. for 1.5 hours. After cooling, the colorless β-(2-cyanoacetyl-3-methyl-6-benzofuranoxy) propionaldehyde polyvinyl acetal was isolated essentially as described in Example I, section C.

D. *Photographic emulsion using β-(2-cyanoacetyl - 3 - methyl - 6 - benzofuranoxy) propionaldehyde polyvinyl acetal.*

Ten (10) parts of β-(2-cyanoacetyl-3-methyl-6-benzofuranoxy) propionaldehyde polyvinyl acetal, 50 parts of ethanol, 150 parts of water and 1 part of 10% sodium carbonate solution was stirred at 75° C. for 10 minutes. The resulting solution was used to prepare a silver halide emulsion essentially as described in Example I, section D. The silver halide emulsion was coagulated, washed, redispersed and coated on film essentially as described in Example I, section D. Processing a piece of the exposed photographic film as outlined in Example I, section D, gave a brilliant magenta negative dye image.

This invention is generic to acetals of aldehydes of the formula OHC—(CH₂)ₙ—Q—R—COCH₂CN wherein R is a divalent radical, aromatic in character, whose terminal atoms are carbon; Q is oxygen or sulfur; and n is an integer from 1 to 6, inclusive. Thus, in addition to acetaldehyde and propionaldehyde, specifically illustrated in the foregoing examples, the aldehyde portion of the molecule can be butyraldehyde, valeraldehyde, hexyl aldehyde or heptyl aldehyde. Preferably, n is 1 or 2, i. e., the aldehyde portion of the molecule is acetaldehyde or propionaldehyde, since halogeno derivatives of these aldehydes are easily obtainable. The nature of the radical R and of its substituents, if any, is largely immaterial provided the radical R is aromatic in character and has, attached to nuclear carbon atoms, a cyanoacetyl group and an oxy or thio group, the latter separating the radical R from the aldehyde portion of the molecule. Thus, the cyanoacetylaryl group attached to the oxy or thio group in the above general formula can be:

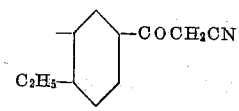

5-cyanoacetyl-2-ethylphenyl

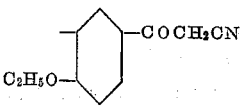

5-cyanoacetyl-2-ethoxyphenyl

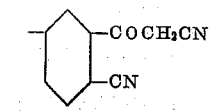

5-cyanoacetyl-4-cyanophenyl

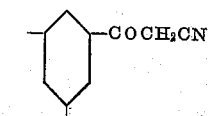

5-cyanoacetyl-3-carbomethoxyphenyl

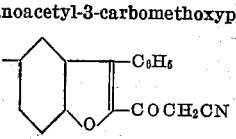

2-cyanoacetyl-3-phenyl-5-benzofuryl

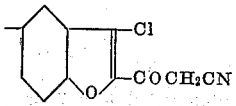

2-cyanoacetyl-6-naphthyl

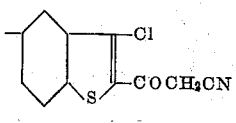

2-cyanoacetyl-3-chloro-5-benzofuryl

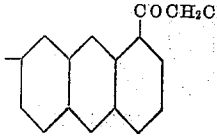

2-cyanoacetyl-3-chloro-5-thianaphthyl

COCH₂CN 1-cyanoacetyl-7-anthryl

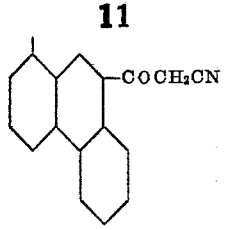

9-cyanoacetyl-1-phenanthryl

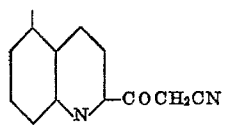

2-cyanoacetyl-5-benzopyridyl

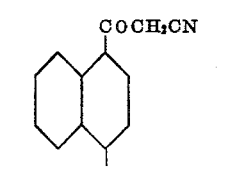

1-cyanoacetyl-4-naphthyl

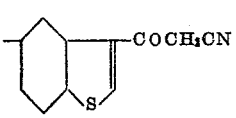

3-cyanoacetyl-5-thianaphthyl

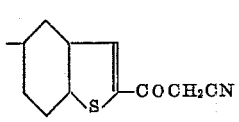

2-cyanoacetyl-5-thianaphthyl

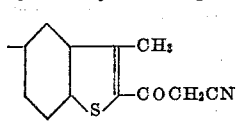

2-cyanoacetyl-3-methyl-5-thianaphthyl

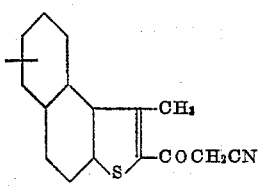

2-cyanoacetyl-3-methyl-6-(or 7, or 8, or 9)-naphtho[2,1-b]thienyl

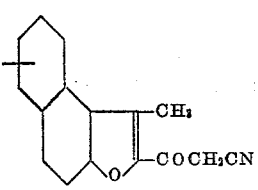

2-cyanoacetyl-3-methyl-6-(or 7, or 8, or 9)-naphtho[2,1-b]furyl

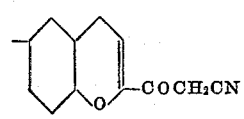

2-cyanoacetyl-6-benzopyryl

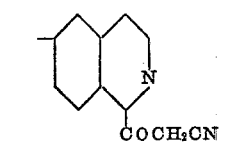

1-cyanoacetyl-6-isoquinolyl

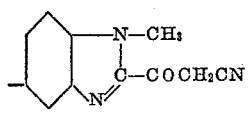

2-cyanoacetyl-3-methyl-6-benzimidazolyl

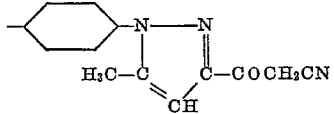

4-(3-cyanoacetyl-5-methylpyrazolyl)-phenyl

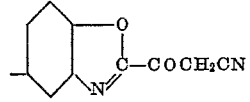

2-cyanoacetyl-5-benzoxazyl

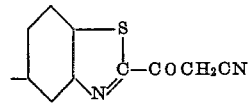

2-cyanoacetyl-5-benzothiazyl

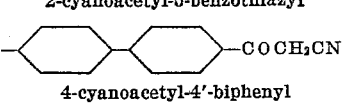

4-cyanoacetyl-4'-biphenyl

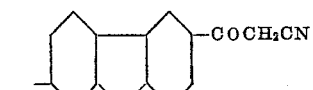

2-cyanoacetyl-7-diphenylene oxide and the like. In general, the most useful compounds of this invention are those in which the radical R is: (a) a nuclear structure, aromatic in character, containing a 6-membered hydrocarbon aromatic ring, such as phenylene, naphthylene, anthrylene, or phenylene bearing substituents such as alkyl, alkoxy, halogen or carbalkoxy groups; (b) a heterocyclic nuclear structure, aromatic in character, containing at least one oxygen, sulfur, or nitrogen atom in the ring configuration, the remainder of the nuclear structure being carbon and hydrogen. The preferred acetals are those which contain a heterocyclic nucleus with the cyanoacetyl group attached to a nuclear carbon atom which is in turn attached to at least one oxygen, sulfur or nitrogen atom in the ring configuration. These color-formers have been found to give the best magenta dyes for the three-color subtractive process.

The alcohol portion of the acetal molecule may be any desired monohydric or polyhydric alcohol. When it is monomeric, it is preferably an alkanol of 1 to 4 carbon atoms, e. g., methanol, ethanol, n-propanol, isopropyl alcohol, n-butanol, sec. butyl alcohol, etc., or a dihydric or trihydric aliphatic alcohol of 2 to 4 carbon atoms, e. g., ethylene glycol, glycerol, 1,2- or 1,3-propylene glycol or 1,2- or 1,3-butylene glycol, and still more preferably an alkanediol of 2 to 4 carbon atoms. When it is polymeric, it may be any completely or partially hydrolyzed polymer of a vinylcarboxylate, particularly a vinyl ester of a monocarboxylic acid of 1 to 4 carbon atoms, e. g., vinylformate, vinylacetate, vinylchloroacetate, vinylpropionate, vinylbutyrate, etc. The vinylcarboxylate should be sufficiently hydrolyzed so that the intralinear groups

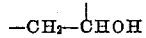

represent at least 50% of the polymer chain, i. e., for every 100 chain atoms there are at least 25 hydroxyl groups. Hydrolyzed interpolymers of vinyl esters with minor proportions (10% or less by weight) of other polymerizable vinyl compounds, e. g., vinyl chloride, methyl methacrylate, etc., may be used, especially when a lower degree of water solubility is desired. In particular, the water-soluble hydrolyzed olefin/vinyl ester interpolymers and especially the hydrolyzed ethylene/vinyl acetate interpolymers described in U. S. Patents 2,386,347 and 2,397,866 are useful. The preferred polyhydric alcohol is polyvinyl alcohol, e. g., substantially completely hydrolyzed polyvinyl acetate, and in particular the polyvinyl alcohols ranging in viscosity from 5 to 50 centipoises in 4% aqueous solution at 20° C.

In the polymeric alcohol acetals of this invention, it is preferred that between 0.75% and 10%, and still more preferably between 0.75% and 7.5%, of the hydroxyl groups of the polymeric alcohol, e. g., polyvinyl alcohol be acetalized with the cyanoacetylaryloxy aldehyde. Below 0.75% acetalization, there are insufficient color-forming groups present to give sufficient color strength in a photographic color film. When more than 10% of the hydroxyl groups of the polyvinyl alcohol are acetalized, the permeability of the layer to the various solutions used to process the photographic film becomes too low for practical application. The polyvinyl acetals falling within the above-defined range are outstanding with respect to top color density, light stability and spectral characteristics in the magenta range on color development with p-aminodiethylaniline type developers. These polymeric compounds are amorphous, high-molecular weight solids which are insoluble in dilute aqueous sodium hydroxide and hot water but are soluble in 10–40% aqueous ethanol and are colorless.

As illustrated in some of the examples, an advantageous modification of the invention is obtained when acidic salt-forming groups are introduced into the polymeric acetal by reaction of the polyvinyl alcohol or partial polyvinyl acetal with aldehydes containing carboxylic or sulfonic acid groups. In addition to the o-sulfobenzaldehyde of the examples, which is the prefered aldehydoacid, suitable compounds include phthalaldehydic acid, glyoxalic acid, and propionaldehyde beta-sulfonic acid. Desirably, from 0.1% to 5% of the hydroxyl groups in the polyvinyl alcohol are acetalized with the aldehydoacid.

The acetals of this invention may be added to gelatin, polyvinyl alcohol, polyvinyl acetals free from color former nuclei or other colloid silver halide emulsions as color-formers. The polyvinyl acetals find use as the sole binders for light-sensitive silver halides for photographic color films. They are resistant to bacterial putrefaction and mold and can be stored for longer periods of time under adverse conditions than the conventional gelatin emulsions. The emulsions of this invention may contain the conventional ingredients, e. g., sensitizing dyes, fog inhibitors, general emulsion sensitizers, etc.

The products of this invention couple with diazonium salts to form azo dyes. This can be utilized in known processes of color photography in which azo dye components are employed. In addition, they can be used for textile dyeings and for decoration purposes, for example, by incorporation in a viscose spinning solution and conversion to a fiber or film which can be locally or completely dyed by treatment with a diazonium salt, oxidized p-phenylenediamine derivatives, or the like.

As many widely different embodiments of this invention can be made without departing from the spirit and scope thereof, it is to be understood that the invention is not to be limited except as defined by the claims.

What is claimed is:

1. Monomeric acetals of the formula:

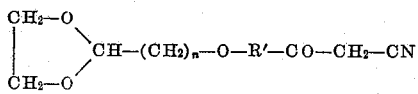

wherein R' is a divalent aromatic hydrocarbon radical and $n$ is an integer from 1 to 6.

2. Monomeric acetals of the formula:

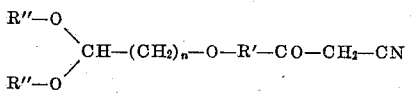

where R'' is an alkyl radical of 1 to 4 carbon atoms, R' is a divalent aromatic hydrocarbon radical and $n$ is an integer from 1 to 6.

3. The compound of the formula:

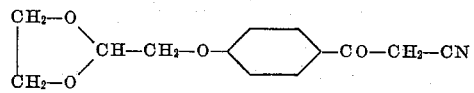

4. The compound of the formula:

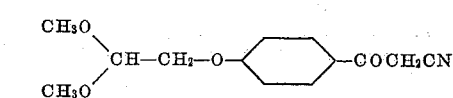

5. The compound of the formula:

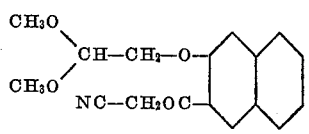

6. Polymeric acetals containing a large number of recurring intralinear

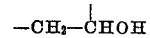

groups and groups of the formula:

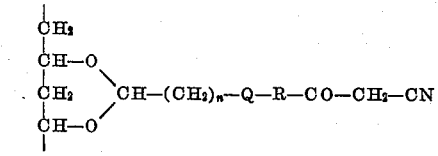

wherein Q is a chalcogen taken from the group consisting of oxygen and sulfur, R is a divalent cyclic radical having a ring selected from the group consisting of (a) an aromatic carbocyclic ring, (b) an aromatic carbocyclic ring fused to a ring taken from the group consisting of furane, thiofurane and azole rings, (c) a pyrazolylphenyl ring, (d) a pyridine ring and (e) a benzopyridine ring, the free valences of said ring which are attached to —Q— and —CO— being on carbon atoms in the ring, the cyanoacetyl group attached to R being the sole cyanoacetyl radical present in the acetals, and $n$ is an integer from 1 to 6.

7. A mixed acetal of β - (2 - cyanoacetyl-3 - methyl - 6 - benzofuraneoxy) propionaldehyde and sodium o-sulfobenzaldehyde with polyvinyl alcohol, containing recurring intralinear

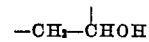

groups.

8. Acetals of the formula:

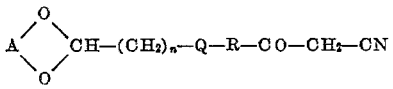

wherein A is the residue of an aliphatic polyhydric alcohol, the carbon atoms of the carbon chain of said alcohol that are attached to the oxygen atoms which are attached to the >CH— group being not more than one carbon atom apart in said chain, Q is a chalcogen taken from the group consisting of oxygen and sulfur, R is a divalent cyclic radical having a ring selected from the group consisting of (a) an aromatic carbocyclic ring, (b) an aromatic carbocyclic ring fused to a ring taken from the group consisting of furane, thiofurane and azole rings, (c) a pyrazolylphenyl ring, (d) a pyridine ring, and (e) a benzopyridine ring, the free valences of said ring which are attached to —Q— and —CO— being on carbon atoms in the ring, the cyanoacetyl group attached to R being the sole cyanoacetyl radical present in the acetals, and $n$ is an integer from 1 to 6.

9. Monomeric acetals of the formula:

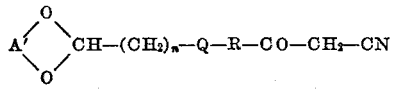

wherein A' is the non-hydroxyl radical of an alkanediol the carbon atoms of which attached to the intracyclic oxygen atoms are not more than one carbon atom apart in said radical, Q is a chalcogen taken from the group consisting of oxygen and sulfur, R is a divalent cyclic radical having a ring selected from the group consisting of (a) an aromatic carbocyclic ring, (b) an aromatic carbocyclic ring fused to a ring taken from the group consisting of furane, thiofurane and azole rings, (c) a pyrazolylphenyl ring, (d) a pyridine ring and (e) a benzopyridine ring, the free valences of said ring which are attached to —Q— and —CO— being on carbon atoms in the ring, and $n$ is an integer from 1 to 6.

References Cited in the file of this patent

UNITED STATES PATENTS

| Number | Name | Date |
|---|---|---|
| 2,099,297 | Clement | Nov. 16, 1937 |
| 2,184,310 | Meigs et al. | Dec. 26, 1939 |
| 2,211,323 | Fordyce | Aug. 13, 1940 |
| 2,253,078 | Lowe | Aug. 19, 1941 |
| 2,269,166 | Salo | Jan. 6, 1942 |
| 2,276,305 | Hershberger | Mar. 17, 1942 |
| 2,282,057 | Hopkins et al. | May 5, 1942 |
| 2,310,943 | Dorough et al. | Feb. 16, 1943 |
| 2,380,033 | Dorough et al. | July 10, 1945 |
| 2,415,381 | Woodward | Feb. 4, 1947 |
| 2,596,755 | Young et al. | May 13, 1952 |

OTHER REFERENCES

McQueen et al.: Journal American Chem. Soc., vol. 73, page 4930, October 1951.